INFRARED SPECTRA OF THE POLYSACCHARIDE

INFRARED SPECTRA OF THE ACETYL POLYSACCHARIDE

United States Patent Office 3,418,311
Patented Dec. 24, 1968

3,418,311
POLYSACCHARIDE AND THE PREPARATION THEREOF
Sumio Sakai, Junichi Sugayama and Gosaku Saito, Tokyo, Teruo Kamasuka, Kodaira-shi, Tokyo, Shoichi Takada Kawaguchi-shi, and Tosio Takano, Tokyo, Japan, assignors to Kaken Kagaku Kabushiki Kaisha, Tokyo, Japan
Continuation-in-part of application Ser. No. 359,929, Apr. 15, 1964. This application Jan. 25, 1966, Ser. No. 522,920
Claims priority, application Japan, Apr. 24, 1963, 38/20,916; Sept. 2, 1963, 38/46,255; Dec. 9, 1963, 38/65,905
7 Claims. (Cl. 260—209)

ABSTRACT OF THE DISCLOSURE

Process for producing a polysaccharide showing activity in the treatment of cancerous tumors in mice comprising treating as the stock, molasses, raw sugars from sugar cane, or liquor extracted by hot water from the leaves and stems of plants of the family of Gramineae, the treatment comprising in any order the three steps of (1) acidifying the stock and discarding the precipitate formed; (2) salting out by saturating with ammonium sulfate and dissolving the precipitate in water; and (3) deionizing the thus formed solution by passage through strongly acidic cation exchange resin and strongly basic anion exchange resin followed by collecting the effluent and isolating the polysaccharide.

---

Figure 1:
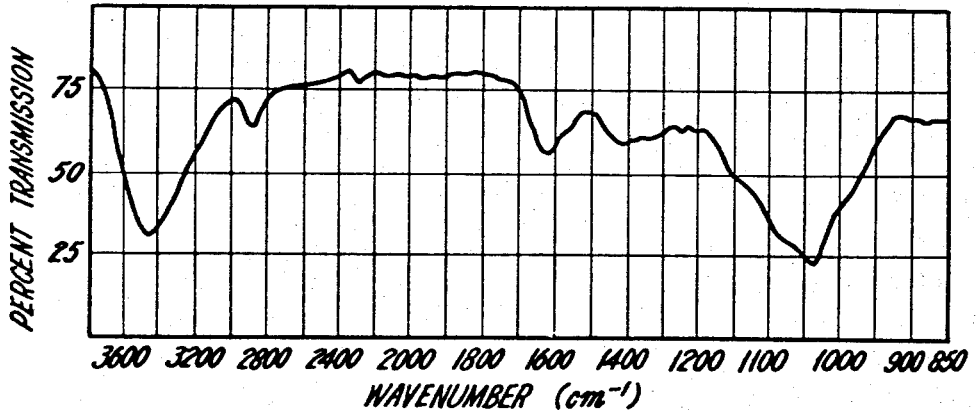

This application is a continuation-in-part of our application Ser. No. 359,929 filed Apr. 15, 1964, now abandoned. The present invention relates to a polysaccharide and a process for the production thereof from plants belonging to the family Gramineae and from molasses prepared from sugar cane. The polysaccharide shows activity in treatment of cancerous tumors in mice.

It has been found that substances active in the treatment of cancerous tumors are present in the extract of bamboo grass and other plants belonging to the family Gramineae and in molasses and raw sugars produced from sugar cane. In contrast with known anti-cancer substances the present anti-cancer substances show significant activity without side reactions.

However, it has been found that it is essential to purify the crude extract in order to reduce toxicity, to isolate the active component and to remove other components which may be active in promoting tumor growth. Purification increases the activity of the anti-cancer substance.

It has been discovered by purification that the active component is a novel polysaccharide.

More particularly, the present invention relates to this novel polysaccharide and to the method of producing it from a stock which may be the extract from plants of the family Gramineae or the molasses prepared from sugar cane. The process of production includes the three essential steps of (1) acidifying and discarding the precipitate formed, (2) salting out by saturating with an inorganic salt, collecting the precipitate and dissolving it in water to form a solution for subsequent treatment and (3) deionizing by passage through a column of a strongly acidic cation exchange resin and a column of a strongly basic anion exchange resin and collecting the effluent. These steps may be carried out in any desired order. Optional steps include (4) dialysing against water and retaining the non-diffusate for subsequent treatment; (5) adding an aqueous solution of lead acetate, discarding the precipitate, adding a water-soluble acid and discarding the further precipitate formed; (6) passing an acidified solution through a column of decolorizing resin.

In step (1) the acidification is preferably carried out to a pH in the range 3–4 by a mineral acid or an organic acid such as acetic acid or trichloroacetic acid.

Step (2) is preferably carried out by saturating with ammonium sulfate.

In step (5) the dilute acid is normally an acid having an anion which forms a water-insoluble salt with lead. Preferably the dilute acid is dilute sulfuric acid.

In step (6) acidification may be carried out by a dilute organic acid such as acetic acid.

The treatment is concluded by isolating the polysaccharide. This is normally carried out by addition of a water miscible organic solvent such as an alcohol having three or less carbon atoms or a lower ketone such as acetone.

The polysaccharide is suitable for injection in the form of a solution or for oral administration into a host for the treatment of cancerous tumors.

Among the raw materials used for the present invention are bamboo and balboo-grass belonging to the family Gramineae, for example:

*Phyllostachys pubescens* Mazel,
*Pleioblastus Simonii* Nakai,
*Pleioblastus Chino* Makino forma Laydekeri Makino,
*Phyllostachys bambusoides* Sieb. et Zucc.,
*Phyllostachys nigra* Munro,
*Sasa nipponica* Makino et Shibata,
*Shibataea Kumasaca* Makino,
*Sasa albo-marginata* Makino et Shibata,
*Sasa paniculata* Makino et Shibata,
*Sasaella ramosa* Makino,
*Pleioblastus Chino* Makino,
*Pleioblastus variegatus* Makino var. *viridis* Makino forma *glabra* Makino.

In particular, *Sasa albo-marginata* Makino et Shib, *Sasa peniculata* Makino et Shib or closely related plants growing wildly in many districts in Japan are suitable, and leaves and stems thereof are principally used as the raw materials.

Other starting plants used in the present invention are plants other than bamboo belonging to the family Gramineae, such as:

*Oryza sativa* L.,
*Hordeum vulgare* L. var. *Hexastichon* Aschers.,
*Triticum aestivum* L.,
*Avena fatua* L.,
*Miscanthus sinensis* Anderss.,
*Phragmites communis* Trinius,
*Setaria italica* Beauv.,
*Panicum miliaceum* L.,
*Sorghum bicolor* Meonch,
*Zea Mays* L.,
*Saccharum officinarum* L.

Leaves and stems of these plants are principally employed.

A further alternative raw material used in the present invention is molasses and raw sugars produced from *Saccharum officinarum* L. When the polysaccharide fraction having anti-cancer activity is produced by the use of plants belonging to the family Gramineae, a considerable amount of the starting plants is required. Therefore, collection and loading of the raw material are not easy. It is inconvenient for producing a large amount of the polysaccharide. On the other hand, in the case of production from molasses and raw sugars as the starting material, the polysaccharide can be produced quite advantageously and on a large scale, since molasses and raw sugars produced from *Saccharum officinarum* L. is quite abundant in resources and produced with low cost, and moreover the step of extracting the starting plant with hot water is not necessary, and the process is simplified.

Examples of carrying out the present invention by use of bamboo, bamboo-grass, and other plants belonging to Gramineae are described below.

In one method of carrying out the present invention, fresh raw materials, for example, of *Sasa albo-marginata*, are directly cut in fine pieces or after collecting the materials are dried and preserved. The cut or preserved materials are used as necessary. In order to make extraction easy, it is desirable that the raw materials are cut as finely as possible prior to their use.

Extraction with hot water is carried out by feeding the raw materials together with an appropriate amount of water into a stainless steel or iron vessel and maintaining the temperature at 60° to 100° C. If the pH value of the extracted solution becomes acidic with the lapse of time, it is advantageous to adjust the pH value to 5–9 constantly with inorganic weak bases such as sodium carbonate, calcium hydroxide and the like for the purpose of advancing the extraction. The extraction is in general repeated twice and when the filtrate is alkaline, the filtrate is neuralized with acids. Thereafter, it is concentrated under a reduced pressure.

As an optional step, the concentrate may be placed in a semi-permeable membrane, e.g. cellophane membrane, subjected to dialysis against running water for 24–48 hours to remove low molecular weight materials, and concentrated under a reduced pressure up to an appropriate amount. Then, in accordance with the invention, the concentrate is saturated with ammonium sulfate, and allowed to stand for 24 hours and the precipitate formed is filtered off. After the precipitate is washed once with saturated ammonium sulfate solution, it is dissolved in water and the resulting solution may be again subjected to dialysis to remove inorganic salts. Then, the non-dialysable liquid is acidified with acetic acid or trichloroacetic acid to remove protein. Thereafter, the acidic liquid may be passed through decolorizing resin such as Duolite S–30 (Taylor-made resin, Chemical Process Co.), whereby dark brown impurities having no anti-cancer activity are absorbed into resin and the effluent is almost completely decolorized. Treatment with lead acetate is also useful for decolorization, since coloring matters and other impurities are precipitated by treatment of lead acetate. Excess lead is successfully removed with ion-exchange resins, which serve principally for deionization.

The decolorized solution is in a convenient manner concentrated to contain about 1–5% of dried materials and mixed with a water-miscible organic solvent such as methanol, ethanol and acetone in an amount of four times as much as the concentrate to separate the polysaccharide, or dried by evaporation to yield the solid polysaccharide.

The material produced by way of example from *Sasa albo-marginata* is non-hygroscopic, pale grey or pale yellowish brown powder which is easily soluble in water, but insoluble in the standard organic solvents. The present substance has the general properties of a polysaccharide. In the color reactions with alpha-naphthol-$H_2SO_4$, Oreinol-HCl, Phenol-$H_2SO_4$, Indole-$H_2SO_4$, tryptophan-$H_2SO_4$, anthrone-$H_2SO_4$, and the like the present substance is positive and in Fehling's, Benedict's, and Tollen's reactions it is negative and does not show reducibility. Also, in Elson-Morgan, Ninhydrin, and Biuret reactions, it is negative and therefore polypeptide and protein are not included. Moreover, the present substance does not show absorption maximum in the range of more than 220 millimicrons in the ultraviolet absorption spectrum. That is to say, nucleic acid and protein are not mixed. In the infrared absorption spectrum, the present substance shows the pattern of a typical polysaccharide. Absorption assigned to the hydroxyl group is lost by acetylation of this substance. It is presumed that the present substance is a polysaccharide of beta-type.

The elementary analysis of the present substance is as follows: C, 44.6%; H, 5.94%, ash, trace; nitrogen, trace. Sulfur and phosphor are not present. The elementary analysis of the acetyl derivative shows the following experimental formula: $(C_{30}H_{40}O_{20})_n$, (C, 49.72%; H, 5.59%). By hydrolysis of the present substance with 1N sulfuric acid for 22 hours at 100° C., mainly three kinds of monosaccharides are confirmed. It has been proved by paper partition chromatography and column chromatography with a strong basic ion exchange resin that they are xylose, arabinose, and galactose, with a trace of uronic acid.

The anti-cancer effect of the product of the present invention was confirmed by the following process employing both the solid type of Ehrlich carcinoma and sarcoma-180. 2,000,000–6,000,000 cancer cells in 1 week old ascitic fluid are transplanted subcutaneously on the back of a mouse. A group is formed by gathering 10 mice. One group is made the control group which is treated with saline. The administration of chemicals is carried out interperitoneally every other day from 24 hours post-implantation and repeated 11 times. The growth conditions of the inoculated subcutaneous carcinoma and sarcoma are recorded with the lapse of time. After 25 days, the average weight of the mice, inhibition ratio of tumor growth, regression ratio of tumor, and death ratio of mice are observed and compared with the control group. The anti-cancer effects of the crude extract which is prepared by extracting the raw material and the purified material produced from *Sasa albo-marginata* in Example 1 are shown in Table 1 and Table 2.

TABLE 1.—EFFECT ON EHRLICH CARCINOMA

| Sample | Dosage (mg./kg.) | Average body weight change (g.) | Mortality | Tumor inhibition ratio (percent) | Percentage of regression (percent) |
|---|---|---|---|---|---|
| Crude extract | 600 | +1.8 | 0/10 | 97.3 | 50 |
| Purified material | 50 | +3.21 | 0/10 | 96.5 | 90 |
| Controls | Saline | +3.17 | 0/10 | | 0 |

TABLE 2.—EFFECT ON SARCOMA-180

| Sample | Dosage (mg./kg.) | Average body weight change (g.) | Mortality | Tumor inhibition ratio (percent) | Percentage of regression (percent) |
|---|---|---|---|---|---|
| Crude extract | 600 | +2.5 | 0/10 | 79 | 80 |
| Purified material | 50 | +2.3 | 0/10 | 93 | 80 |
| Controls | Saline | +2.8 | 0/10 | | 0 |

The purified polysaccharide produced from *Sasa albo-marginata* in an amount of 50 mg./kg. has strong anti-cancer activity against Ehrlich carcinoma and sarcoma-180 and can regress the tumors of most animals. The inoculated cell grows gradually until about 11 days post-implantation, but from 11 days, the tumor is reduced in the group to which the polysaccharide of the present invention is administered. At about the 20th day, most of the tumors disappear. Even if they remain, they are small lumps consisting of binding tissue. However, such a tendency cannot be observed in the control group. Up to the present it has not been found that any of the materials which are said to be effective for curing cancer have activity regressing such solid type tumors without lowering the body weight of tumor bearing animals and causing side reactions. This is a characteristic of the present product of this invention.

The polysaccharides prepared from plants belonging to the family Gramineae other than bamboo-grass, bamboo-sprouts and bamboo-sheaths by the process of this invention have the same chemical properties and similar constitutional sugars, namely xylose, arabinose, galactose and a trace of uronic acid as one prepared from bamboo-grass. Glucose is detected in some of the plants according to the season of collection. These show also remarkable anti-cancer effect against transplantable mouse tumors as illustrated in Tables 2A and 2B. Due to the extensive existence of the polysaccharide in plants of the family Gramineae, and the resulting abundance in raw materials, it is possible to manufacture the polysaccharide on an industrial scale.

permeable membrane such as cellophane paper. The period of the dialysis is different according to the kind of raw material, concentration, size of the vessel, etc. Most of the dialysable materials run out in 12–24 hours. As the semi-permeable membrane, bladder membrane, collodion membrane and the like may be used. Cellophane TABLE 2A.—EFFECT OF POLYSACCHARIDE PREPARED FROM OTHER MATERIALS THAN BAMBOO-GRASS ON SUBCUTANEOUSLY IMPLANTED EHRLICH CARCINOMA

| Compounds from— | Dosage (mg./kg.) (No. doses) | Average body weight change (g.) | Average tumor weight (g.) | Mortality | Tumor inhibition ratio (percent) | Progress of tumor volume | | | |
|---|---|---|---|---|---|---|---|---|---|
| | | | | | | 1 | 2 | 3 | 4 |
| C | P | 1.0 | 0.9 | 0/5 | | 0 | 0 | 0 | 5 |
| Straw of rice-plant (1) | 100×14 | 1.5 | 0 | 0/5 | 100 | 5 | 0 | 0 | 0 |
| C | P | 1.0 | 0.9 | 0/5 | | 0 | 0 | 0 | 5 |
| Bagasses (2) | 50×14 | 1.9 | 0 | 0/5 | 100 | 5 | 0 | 0 | 0 |
| C | P | 2.8 | 1.33 | 0/5 | | 0 | 0 | 1 | 4 |
| Molasses (3) | 100×14 | 3.4 | 0 | 0/5 | 100 | 5 | 0 | 0 | 0 |
| Leaf and stem of corn (4) | 100×14 | 3.1 | 0 | 0/5 | 100 | 5 | 0 | 0 | 0 |
| Oat straw | 100×14 | 4.0 | 0.51 | 0/5 | 63 | 3 | 2 | 0 | 0 |
| C | P | 3.0 | 5.38 | 0/5 | | 0 | 0 | 0 | 5 |
| Wheat straw (5) | 100×14 | 2.1 | 2.94 | 0/5 | 46 | 0 | 2 | 2 | 1 |
| Bamboo shoot | 100×14 | 1.5 | 0.38 | 1/5 | 95 | 2 | 1 | 1 | 0 |
| Husk of bamboo shoot | 100×14 | 3.1 | 1.84 | 0/5 | 66 | 0 | 2 | 1 | 2 |

C=Control group. P=Saline.
The substances (1)–(6) was prepared by the process described in following examples: (1) Example 6; (2) Example 5; (3) Example 4; (4) Example 8; (5) Example 3.

TABLE 2B.—EFFECT OF POLYSACCHARIDE PREPARED FROM OTHER MATERIALS THAN BAMBOO-GRASS ON SUBCUTANEOUSLY IMPLANTED SARCOMA-180

| Compounds from— | Dosage (mg./kg.) (No. doses) | Average body weight change (g.) | Average tumor weight (g.) | Mortality | Tumor inhibition ratio (percent) | Progress of tumor volume | | | |
|---|---|---|---|---|---|---|---|---|---|
| | | | | | | 1 | 2 | 3 | 4 |
| C | P | 2.0 | 3.5 | 0/7 | | 0 | 1 | 0 | 6 |
| Bagasses (1) | 50×14 | 1.8 | 0.02 | 0/7 | 99 | 6 | 1 | 0 | 0 |
| Molasses (2) | 50×14 | 2.3 | 0.11 | 0/7 | 70 | 3 | 0 | 1 | 3 |
| C | P | 4.1 | 2.18 | 0/7 | | 0 | 1 | 0 | 6 |
| Straw of rice plant (3) | 50×14 | 3.2 | 0.19 | 0/7 | 91 | 5 | 1 | 0 | 1 |
| Barley straw | 50×14 | 4.4 | 0.32 | 0/7 | 85 | 4 | 0 | 2 | 1 |
| Leaf and stem of corn (4) | 50×14 | 3.7 | 0.28 | 0/7 | 87 | 4 | 1 | 1 | 1 |
| C | P | 2.8 | 2.75 | 0/7 | | 0 | 0 | 2 | 5 |
| Pasture | 50×14 | 3.8 | 0.79 | 0/7 | 71 | 4 | 2 | 1 | 0 |
| C | P | 4.6 | 4.82 | 0/8 | | 0 | 1 | 0 | 7 |
| Chaffs | 100×14 | 4.3 | 0.03 | 0/8 | 99 | 6 | 1 | 0 | 0 |

C=Control group. P=Saline.
The substances (1)–(4) was prepared by the process described in following examples: (1) Example 7; (2) Example 10; (3) Example 6; (4) Example 8.

The alternative method of carrying out the present invention by use of molasses and raw sugars produced from sugarcane as the raw material is explained in the following. As an optional preliminary step, molasses or raw sugars is dialysed against running water by use of a semi-permeable membrane such as cellophane paper to remove low molecular weight materials contained such as cane sugar, invert sugar, nitrogen-containing organic materials, ash and the like, and the non-dialyzable materials are collected. Then, salting out of the non-dialyzable materials is carried out by saturating with inorganic salts such as ammonium sulfate. Protein is removed by acidification. Then, treatment with ion exchange resin is effected. If necessary, treatments with lead acetate and decoloring resin are carried out thereby to purify finally. The order of these treatments may be changed as necessary.

Molasses to be used as the raw material in the processes of the present invention is prepared in the industry of producing cane sugar. Namely, it is obtained when cane sugar is produced by concentrating the extracted solution of sugar cane or when crude cane sugar is purified.

In molasses considerable amounts of cane sugar or invert sugar remain. High molecular weight polysaccharides are also present. The object material having anti-cancer activity is a special component among these high molecular weight materials, and can be salted out with inorganic salts such as ammonium sulfate. Accordingly, the objective material can be obtained by effecting the operation of salting out without carrying out dialysis, and then removing organic and inorganic impurities by use of acidification and ion-exchange resins. However, in order to effect purification with good efficiency, it is advantageous to carry out dialysis previously and thereby to remove almost all of the low molecular weight materials.

The dialysis of molasses or raw sugars is carried out for 24 hours against running water by use of a semi-permeable membrane such as cellophane paper. The period of the dialysis is different according to the kind of raw material, concentration, size of the vessel, etc. Most of the dialysable materials run out in 12–24 hours. As the semi-permeable membrane, bladder membrane, collodion membrane and the like may be used. Cellophane paper which is homogeneous and can be produced on a large scale is especially suitable. After dialysis, the solution containing non-dialysable materials is concentrated under a reduced pressure.

Whether after dialysis or not, inorganic salts are added at room temperature to saturate, and thereafter the saturated solution is allowed to stand overnight. Sodium chloride may be employed as an inorganic salt, but ammonium sulfate is used for the operation with good yield and therefore it is most suitable. After the precipitate is centrifuged and washed several times with a saturated salt solution, the precipitate is dissolved again in water, followed by removing the inorganic salts by use of ion-exchange resins. Then, the residue is concentrated to an appropriate concentration and mixed with, for example, trichloroacetic acid or acetic acid whereby protein is removed. The clear acidic filtrate may then be passed through a column of decoloring resins such as activated Duolite S–30, and Duolite A–7 (Chemical Process Co.) and the effluent is concentrated under a reduced pressure to an appropriate concentration. The concentrate is mixed with water miscible solvents such as methanol, ethanol, acetone and the like to precipitate out, or concentrated to dryness.

For purifying the product, treatment with lead acetate may be carried out, if necessary, thereby to adjust the quality of the product. The product is not precipitated with lead acetate.

The effective components are concentrated with high efficiency by salting out, but at the same time impurities such as protein and coloring matter are also concentrated. Therefore, it is necessary to remove protein by acidification. Proteins as well as coloring matters are also absorbed into the resin by treatment with decoloring resin, and removed. By treatment with lead acetate, tool, coloring matter and other impurities are removed successfully.

The object material is also contained in a small amount in the raw sugar. In the case using the raw sugars as a raw material, the processes of purification were done successfully in the same manner as described above.

The purified polysaccharide is a non-hygroscopic white or grey powder, which is soluble in water, but insoluble in general organic solvents. The present substance has a neutral character and is stable to heat, but it is decomposed by heating under acidic and alkaline conditions. The present substance has the general properties of a polysaccharide and does not contain reducing sugar, monosaccharide, amino sugar or amino acid. By hydrolysis of the present substance with 1 N sulfuric acid at 100° C. for 22 hours, it is decomposed into mainly three kinds of monosaccharides, which are xylose, arabinose, galactose, and a trace of uronic acid.

The anti-cancer activity of the material produced from molasses in Example 4 by the present invention is examined by the method described previously and the results are shown in the following Tables 3 and 4.

TABLE 3.—EFFECT ON EHRLICH CARCINOMA

| | Dosage (mg./kg.) | Average body Weight change (g) | Mortality | Average weight of tumor (g) | Tumor inhibition ratio (percent) | Percentage of regression (percent) |
|---|---|---|---|---|---|---|
| Control group | Saline | +2.82 | 0/10 | 1.38 | | 0 |
| Treated group | 100 | +3.4 | 0/10 | 0 | 100 | 100 |

TABLE 4.—EFFECT ON SARCOMA-180

| | Dosage (mg./kg.) | Average body Weight change (g) | Mortality | Average weight of tumor (g) | Tumor inhibition ratio (percent) | Percentage of regression (percent) |
|---|---|---|---|---|---|---|
| Control group | 0 | +2.42 | 0/10 | 1.83 | | 0 |
| Treated group | 50 | +2.6 | 0/10 | 0.18 | 94 | 80 |

As clear from the result shown in the above tables, the substance produced according to the present invention shows significant anti-cancer effect against Ehrlich carcinoma and Sarcoma-180, and can regress many tumors in mice. The tumors inoculated in both control group and treated group grow gradually until the 11th day post-implantation. After the 11th day the tumors are reduced gradually in the group to which the substance produced by the present invention is given and at about the 20th day, the tumors almost disappear. Even if they remain, they are small lumps of binding tissue. Such a phenomenon cannot be found in the control group. Animals to which the substance of the present invention is given grow normally and toxicity is not observed. Up to the present chemicals which have such a strong anti-cancer activity without showing side-reactions has not been discovered.

As explained above, an object of the present invention is to provide a process for producing substances possessing anti-cancer activity by employing plants belonging to the family Gramineae and molasses and the substances produced thereby.

The process for the production of the crude extract, the toxicity and anti-cancer activity of the crude extract, purification of the crude extract, properties of the purified material, hydrolysis of the purified material, anti-cancer activity of the purified polysaccharide and the like in the case of using bamboo and bamboo grass as the raw materials are explained in detail in the following.

(I) Crude extract.—The collected leaves were dried, cut in fine pieces, and then extracted with water in an amount of seven times as much as the raw material at 90–100° C. for about 5 hours with stirring. When the extract became acidic with the lapse of time, a small amount of calcium hydroxide was added to maintain the pH value at neutral. After cooling, the extract was filtered and the filtrate was concentrated under a reduced pressure, and dried. The powder was called the "crude extract." An example of analysis of the crude extract was as follows: Total N: 1.96%. Ash: 24.6%.

Toxicity of the crude extract.—Acute toxicity was examined by use of mice (DDY strain) of 18–20 g. When 625 mg./kg. of crude extract produced from Sasa albo-marginata (Makino et Shibata) which had been collected in February, 1962 at Mt. Tanzawa was intravenously injected, the mouse lived but when 1250 mg./kg. of the crude extract was injected the mouse died immediately after the injection. In the case of intraperitoneal injection in an amount of 1000 mg./kg., 7 mice lived among 10 mice, but in the case of 2500 mg./kg., all of the mice died in 24 hours.

Anti-cancer activity.—Anti-cancer activity of the crude extract on the transplantable mouse tumors was also examined.

(a) Ascitic tumor.—Details of the method are in the Section VI. The results on ascitic tumors are shown in Table 5.

TABLE 5.—EFFECT OF CRUDE EXTRACT ON ASCITIC TUMORS

| Samples | Dosage (mg./kg.) | Average survival (days) | |
|---|---|---|---|
| | | Ehrlich carcinoma | Sarcoma-180 |
| Control | Saline | 12.2 | 15.8 |
| Kuma-sasa from Mt. Tanzawa Feb. 1962 | 600 | 13.2 | 18.6 |
| Do | 400 | *16.5 | |
| Do | 200 | 14.2 | |

*Except for one mouse which survived longer than fifty days.

When the crude extract collected at Mt. Tanzawa was intraperitoneally injected in a dosage of 600 or 200 mg./kg., no survival effects against Ehrlich carcinoma and sarcoma-180 were observed.

(b) Subcutaneous tumor.—Details of the method of obtaining results are described in the Section VI later in this specification.

TABLE 6.—EFFECT OF CRUDE EXTRACT ON SUBCUTANEOUSLY IMPLANTED EHRLICH CARCINOMA

| Samples | Dosage (mg./kg.) | Average body weight change (g) | Average tumor weight (g) | Mortality | Tumor inhibition ratio (per cent) | Progress of tumor volume | | | |
|---|---|---|---|---|---|---|---|---|---|
| | | | | | | 1 | 2 | 3 | 4* |
| Control | Saline | +1.1 | 1.55 | 0/10 | | 0 | 1 | 2 | 7 |
| Kuma-sasa Mt. Zao, 1961 | 400 | +2.5 | 0.94 | 2/10 | 39 | 2 | 1 | 1 | 4 |
| Control | Saline | +2.1 | 2.05 | 0/10 | | 0 | 0 | 1 | 9 |
| Kuma-sasa Mt. Tanzawa, Feb., 1962 | 600 | +1.8 | 0.06 | 0/10 | 97 | 5 | 3 | 2 | 0 |
| Do | 400 | +2.0 | 1.20 | 1/10 | 42 | 3 | 3 | 0 | 3 |
| Do | 200 | +2.0 | 1.82 | 0/10 | 11 | 1 | 1 | 2 | 6 |
| Control | Saline | +1.3 | 3.61 | 1/10 | | 0 | 0 | 1 | 9 |
| Kuma-sasa Bandai area, Apr. 1962 | 600 | +2.0 | 0.62 | 0/10 | 83 | 2 | 4 | 1 | 3 |
| Nemagari-take, Bandai area, April 1962 | 600 | +1.5 | 2.19 | 0/10 | 39 | 1 | 4 | 0 | 5 |
| Control | Saline | +1.1 | 1.55 | 0/10 | | 0 | 1 | 2 | 7 |
| Sasa, Yakushima, 1961 | 400 | +2.3 | 0.09 | 0/10 | 94 | 9 | 0 | 0 | 1 |
| Control | Saline | +6.0 | 4.30 | 1/10 | | 0 | 0 | 1 | 8 |
| Sasa, Yakushima, 1961 | 200 | +6.2 | 2.56 | 0/10 | 41 | 4 | 1 | 1 | 4 |

*1=No. of Regression. 2=No. of Decrease. 3=No. of Unchange.

The results of the action of the crude extract on Ehrlich carcinoma are shown in Table 6. The crude extract produced from bamboo-grass colected at Yakushima was most effective. That is to say, the inhibition ratio was 94% in the case of doses of 400 mg./kg. Tumors were regressed completely in 9 mice among 10 mice in 25 days. Crude extract produced from bamboo-grass collected at Mt. Tanzawa was the second most effective. The dosage of 600 mg./kg. resulted in an inhibition ratio of 97%. Tumors were regressed in 8 mice among 10 mice. A high dosage showed strong anti-cancer effect. The effect was also observed in the crude extract produced from *Sasa albo-marginata* Makino et Shibata (Kuma sasa) collected at Mt. Zao and Mt. Bandai. The comparison of the effect on Ehrlich carcinoma depending upon the period of collection is shown in Table 7. The crude extracts were produced from raw materials collected at the same place in Mt. Tanzawa in February, July and October, 1962, according to the same extracting process. The results of the sample collected in winter are better than those collected in summer.

As clear from Table 8, Nitromine showed no effect, and the inhibition ratios of Mitromycin C and Chromomycin A3 were 76% and 53%, respectively. However no tumor was regressed. It is considered to be difficult, judging from the change of body weight, to increase the dosage. Therefore, the effect is considered to be at the limit. In the case of using the crude extract of plants of the family Gramineae, a decrease of body weight was not observed. The microscopic observations in regard to the results of Table 11 are described as follows: In the control group, 3 of 10 mice suffered from anemia. However, in the case of using the crude extract in a dosage of 600 mg./kg., all of the 10 mice were normal. On the contrary, atrophy of the spleen and anemia were observed in the group to which Mitomycin C was administered.

Table 9 shows the results in the case of administrations before and after inoculation of Ehrlich carcinoma cells. A dose of 400 mg./kg. of crude extract obtained from Yakushima-take was given every other day. The group which was injected 10 times before inoculation of tumor cels and 11 times after the inoculation up to a total

TABLE 7

| Date | Dosage (mg./kg.) | Average body weight change (g.) | Average tumor weight (g.) | Mortality | Tumor inhibition ratio (percent) | Progress of tumor volume | | | |
|---|---|---|---|---|---|---|---|---|---|
| | | | | | | 1 | 2 | 3 | 4 |
| Control | Saline | +3.6 | 3.19 | 2/10 | | 0 | 0 | 1 | 9 |
| Feb. 1962 | 600 | +2.9 | 0.80 | 0/10 | 75 | 5 | 1 | 1 | 3 |
| Control | Saline | +0.8 | 2.23 | 0/10 | | 0 | 1 | 1 | 8 |
| July 1962 | 600 | +1.8 | 1.46 | 1/10 | 35 | 2 | 1 | 2 | 4 |
| Sept. 1962 | 600 | +1.7 | 2.02 | 0/10 | 10 | 3 | 1 | 1 | 5 |

The effects of the crude extract prepared from Kuma-sasa and Nemagari-take, which were collected at the same place a tthe same time, were compared with each other. Their inhibition ratios were 83% and 39%, respectively, and Kuma-sasa was better in efficiency than Nemagari-take.

Experiments on the anti-cancer effec tof Nitromine, of 21 times, however, was not better than the group to which administration was carried out 11 times after the inoculation. The group to which administration was effected 6 times was inferior in inhibition ratio to the group to which administration was effected 10 times before the inoculation. However, the regression condition of tumors was almost the same in all cases.

TABLE 9
[Dosage, 400 mg./kg. of crude extract]

| Administration | | Average body weight change (g.) | Average tumor weight (g.) | Mortality | Tumor inhibition ratio (percent) | Progress of tumor volume | | | |
|---|---|---|---|---|---|---|---|---|---|
| Before | After | | | | | 1 | 2 | 3 | 4 |
| Control | | +1.1 | 1.55 | 1/10 | | 0 | 1 | 2 | 7 |
| | *X11 | +2.3 | 0.09 | 1/10 | 94 | 9 | 0 | 0 | 1 |
| Control | | +2.22 | 1.46 | 1/10 | | 1 | 1 | 1 | 6 |
| X10 | X11 | +3.3 | 0.19 | 1/10 | 87 | 7 | 0 | 3 | 0 |
| | X6 | +3.9 | 0.27 | 1/10 | 82 | 3 | 0 | 4 | 2 |
| X10 | | +3.9 | 0.83 | 1/12 | 42 | 3 | 0 | 4 | 4 |

*X=times of dose.

Mitomycin C and Chromomycin A3 which are sold in the market as substances having anti-cancer activity were also carried out by the same methods and the results were compared with those of the crude extract of plants of the family Gramineae. The results on Ehrlich carcinoma are shown in Table 8.

These experiments were carried out on Ehrlich solid carcinoma, but the effect on sarcoma-180 was similar to that on Ehrlich carcinoma. The results of the crude extract from Kuma-sasa collected at Mt. Tanzawa on sarcoma-180 are shown in Table 10.

TABLE 8.—EFFECT OF VARIOUS ANTI-CANCER AGENTS ON SUBCUTANEOUS EHRLICH CARCINOMA

| Compounds | Dosage (mg./kg.) | Average body weight change (g.) | Average tumor weight (g.) | Mortality | Tumor inhibition ratio (percent) | Progress of tumor volume | | | |
|---|---|---|---|---|---|---|---|---|---|
| | | | | | | 1 | 2 | 3 | 4 |
| Control | Saline | +2.2 | 1.46 | 1/10 | | 1 | 1 | 1 | 6 |
| Nitromine | 10 | +1.0 | 1.78 | 1/10 | −22 | 0 | 0 | 1 | 8 |
| Control | Saline | +2.1 | 2.05 | 1/10 | | 0 | 0 | 1 | 9 |
| Mitomycin C | 1.8 | +0.4 | 0.50 | 1/10 | 76 | 0 | 1 | 3 | 6 |
| Do | 2.3 | +0.2 | 0.30 | 1/10 | 85 | 0 | 3 | 3 | 3 |
| Control | Saline | +1.3 | 3.61 | 1/10 | | 0 | 0 | 2 | 8 |
| Chromomycin A3 | 20 | +1.9 | 1.69 | 1/10 | 53 | 0 | 0 | 3 | 7 |

TABLE 10.—EFFECT ON SARCOMA-180

| Compound | Dosage (mg./kg.) | Average body weight change (g.) | Average tumor weight (g.) | Mortality | Tumor inhibition ratio (percent) | Progress of tumor volume | | | |
|---|---|---|---|---|---|---|---|---|---|
| | | | | | | 1 | 2 | 3 | 4 |
| Control | Saline | +3.1 | 0.84 | 1/10 | | 1 | 0 | 3 | 5 |
| Crude extract | 600 | +1.0 | 0.18 | 0/10 | 79 | 8 | 0 | 0 | 2 |

Progress of increase and decrease of Ehrlich carcinoma treated with the crude extract was compared with that in the group treated with Mitomycin C by expressing tumor area. The maximum length and the minimum length of a tumor recorded on the 9, 14, 17, 21 and 25th day post-implantation were multiplied by each other, respectively. The average area of each group is shown in Table 11.

TABLE 11.—PROGRESS OF TUMOR AREA (mm.$_2$)

| Compounds | Dosage (mg./kg.) | 9th day | 14th day | 17th day | 21st day | 25th day |
|---|---|---|---|---|---|---|
| Control | Saline | 88 | 156 | 184 | 267 | 254 |
| Crude extract | 600 | 79 | 67 | 44 | 26 | 19 |
| Do | 400 | 94 | 133 | 126 | 143 | 152 |
| Mitomycin C | 1.8 | 42 | 72 | 85 | 116 | 106 |

TABLE 12

| Crude extract | EtOH added (ml.) | EtOH concentration of filtrate (v. percent) | Weight of precipitate (g.) | Fractions |
|---|---|---|---|---|
| 10 g. in 20 ml | 40 | 66.7 | 0.5 | F-I |
| | 40 | 80.0 | 1.4 | F-II |
| | 80 | 89.0 | 1.4 | F-III |
| | Filtrate | | 6.0 | F-IV |

The results of anti-cancer examination of the fractions on Ehrlich carcinoma are shown in Table 13.

TABLE 13

| Fractions | Dosage (mg./kg.) | Average body weight change (g.) | Average tumor weight (g.) | Mortality | Tumor inhibition ratio (percent) | Progress of tumor volume | | | |
|---|---|---|---|---|---|---|---|---|---|
| | | | | | | 1 | 2 | 3 | 4 |
| Control | Saline | +0.9 | 1.91 | 1/10 | | 0 | 0 | 0 | 9 |
| Crude extract | 600 | +1.4 | 0 | 2/10 | 100 | 8 | 0 | 0 | 0 |
| F-I | 30 | +1.7 | 1.20 | 0/10 | 38 | 0 | 2 | 3 | 5 |
| F-II | 90 | +2.0 | 0.68 | 0/10 | 65 | 3 | 1 | 3 | 3 |
| F-III | 90 | +2.1 | 2.29 | 0/10 | −20 | 0 | 2 | 1 | 7 |
| F-IV | 390 | +1.6 | 2.92 | 0/10 | −53 | 0 | 0 | 1 | 9 |
| Control | Saline | +3.0 | 2.83 | 0/10 | | 1 | 0 | 0 | 9 |
| F-I | 200 | +3.9 | 0.63 | 0/10 | 78 | 4 | 1 | 2 | 3 |
| F-I | 200 | +3.0 | 1.11 | 0/10 | 61 | 1 | 2 | 4 | 3 |
| F-II | 400 | +1.9 | 0.07 | 0/10 | 98 | 5 | 4 | 1 | 0 |

The tumors of the group of which 600 mg./kg. of the crude extract was administered grew for 9 days as well as the control group, but after that gradually decreased and on the 21st day remarkably decreased, and most of the tumors regressed on the 25th day. On the contrary, in the group treated with Mitomycin C, tumors increased gradually from the first, but even on the 25th day they did not regress.

(II) Purification.—As mentioned above, we have found that the crude extract of plants of the family Gramineae has a significant anti-cancer activity. Then, studying the effective components, we have discovered that the principal component is a polysaccharide and the crude extract contains said polysaccharide which consists mainly of three monosaccharides.

Subcutaneous Ehrlich carcinoma was used for examination of the anti-cancer activity, and the following procedures to separate and purify the effective components were used.

(a) Fractionation with ethanol.—10 g. of dry powder of the crude extract extracted from Kuma-sasa, Sasa albomarginata, collected at Mt. Tanzawa as shown in Table 6 was dissolved in water up to 20 ml. 40 ml. of ethanol was added to the solution and the precipitate was filtered off. The precipitate was collected, and dried (Fr. I).

40 ml. of ethanol was added again to the filtrate and the precipitate was collected (Fr. II). 80 ml. of ethanol was added further to the resulting filtrate and the precipitate was collected (Fr. III). The filtrate was concentrated under a reduced pressure and dried to make a solid powder (Fr. IV). They are shown in Table 12.

It was found that (Fr. I–Fr. III) are effective and (Fr. IV) is not effective. The effective components are precipitated at the concentration of about 90% ethanol. When ethanol soluble matter (Fr. IV) was used, it was observed that the tumors became worse. This part was 60% (by weight) of the crude extract. Fractions (Fr. I–III) are treated hereinafter as one fraction and called the "EtOH ppt."

Other examples of the "EtOH ppt" are given in the following. When 600 mg./kg. of the crude extract produced from Chimaki-sasa collected in Bandai district was used, the following results were obtained; i.e., Av. tumor weight: 0.62 g., inhibition ratio: 82.8%, regression: 2, decrease: 4, unchange: 1, increase: 3 (control: Av. tumor weight: 3.61 g., regression: 0, decrease: 0, unchange: 1, increase: 9). 50 g. of this crude extract was dissolved in 100 ml. of water and 800 ml. of ethanol were added. The "EtOH ppt" was dried to yield 23 g. The anti-cancer activities of this fraction in various doses are shown in Table 14.

TABLE 14

| Fractions | Dosage (mg./kg.) | Average body weight change (g.) | Average tumor weight (g.) | Mortality | Tumor inhibition ratio (percent) | Progress of tumor volume | | | |
|---|---|---|---|---|---|---|---|---|---|
| | | | | | | 1 | 2 | 3 | 4 |
| Control | Saline | +2.32 | 2.7 | 1/10 | | 0 | 0 | 0 | 9 |
| EtOH | 50 | +2.19 | 0.76 | 0/10 | 72.0 | 1 | 4 | 1 | 4 |
| EtOH | 100 | +2.38 | 1.21 | 1/10 | 55.2 | 4 | 0 | 1 | 4 |
| EtOH | 200 | +1.3 | 0.40 | 0/10 | 85.2 | 7 | 0 | 1 | 2 |

The result becomes better in accordance with increase of dosage. The weight of the ethanol soluble fraction was about a half of the crude extract. This fraction has no anti-cancer activity, and therefore it is said that treatment with ethanol about doubles the concentration.

(b) Extraction with ether.—Since the effective components are precipitated with ethanol, it is expected that the effective components are hardly soluble in organic solvents. However, when extraction is carried out with ether under acidic conditions, some parts of the components are dissolved. Therefore, these parts are taken out and the anti-cancer activity of the parts examined.

5 g. of the "EtOH ppt" prepared by treating the crude extract with ethanol was dissolved in water to make 10 ml. Then, dilute sulfuric acid was added to the solution to make the pH 1.0. The separated insoluble matters were filtered. The filtrate was mixed with 50 ml. of ether and the extraction was repeated 8 times in the same way (The total amount of ether used was 400 ml.). Ether was distilled off and the residue was dried. 750 mg. of brown oil was obtained. The brown oil is ether extract. The residue after extraction with ether was then extracted with ethyl acetate. Almost no matter was removed by the solvent. The water layer was mixed with caustic alkali to adjust the pH value about at 7.0, and dried under a reduced pressure. 2.3 g. of residue was obtained. The results of the anti-cancer examination of these substances are shown in Table 15.

TABLE 15

| Fractions | Doses (mg./kg.) | Average body weight change (g.) | Average tumor weight (g.) | Mortality | Tumor inhibition ratio (percent) | Progress of tumor volume | | | |
|---|---|---|---|---|---|---|---|---|---|
| | | | | | | 1 | 2 | 3 | 4 |
| Control | Saline | +2.62 | 3.23 | 1/10 | ---------- | 0 | 0 | 1 | 8 |
| Ether extract | 250 | +2.26 | 2.34 | 1/10 | 27.5 | 0 | 0 | 2 | 7 |
| Residue | 400 | +1.55 | 0.45 | 0/10 | 86.0 | 7 | 1 | 0 | 2 |

It is clear that the effective materials are not extracted with ether.

(c) Fractionation with ion-exchange resin.—7.5 g. of the "EtOH ppt" was dissolved in water to make 150 ml. of a solution. The solution was passed through a column of 50 ml. of sulfonic acid type strong acidic ion exchange resin, Amberlite IR–120 (H-form) (Rohm & Hass Co.) and washed with 200 ml. of water. The column was eluted with 500 ml. of 2 N. ammoniac. The ammoniac elute was collected, concentrated under a reduced pressure and dried. The yield was 0.5 g. The fraction consisted of basic substances and amino acids. This fraction was called "basic fraction." It was strongly positive in ninhydrin reaction. The effluent which passed through IR–120 resin was acidic, and the effluent was passed through a column of 100 ml. of tertiary amine type strong basic ion exchange resin, Amberlite IRA–410 (OH-form) (Rohm & Hass Co.). The column was washed with about 1 liter of water and the wash water mixed with the effluent. By drying the mixture under a reduced pressure, 1.7 g. of brown powder was obtained. It was called "neutral fraction." The column of IRA–410 was eluted with about 500 ml. of a 2 N. ammonium corbonate solution. After concentrating the elute, the concentrate was passed through a column consisting of 20 ml. of Amberlite IR–120 (H-form), thereby to yield acidic effluent. The effluent was evaporated and dried to yield 1.6 g. of dark brown powder. The powder was called "acidic fraction." Yields and reactions of these fractions are shown in Table 16,

TABLE 16

| Fractions | "EtOH ppt." used, 7.5 g. | Ratio, percent | pH | Reactions |
|---|---|---|---|---|
| Neutral fraction | 1.7 | 8.4 | 7 | $NH_3$-$AgNO_3$ positive. |
| Acidic fraction | 1.6 | 26.7 | 2 | Organic acid positive. |
| Basic fraction | 0.5 | 28.4 | 11 | Ninhydrin positive. |
| Loss | 3.7 | 36.8 | | Inorganic salts. | and the results of the anti-cancer activities of these fractions are shown in Table 17.

TABLE 17

| Fractions | Dosage (mg./kg.) | Average body weight change (g.) | Average tumor weight (g.) | Mortality | Tumor inhibition ratio (percent) | Progress of tumor volume | | | |
|---|---|---|---|---|---|---|---|---|---|
| | | | | | | 1 | 2 | 3 | 4 |
| Control | Saline | +2.9 | 2.28 | 1/10 | ---------- | 1 | 0 | 2 | 7 |
| Neutral Fr | 300 | +2.6 | 0.58 | 1/10 | 74.6 | 6 | 3 | 0 | 1 |
| Acidic Frg | 300 | +1.4 | 2.28 | 1/10 | 0 | 0 | 1 | 0 | 8 |
| Basic Frg | 100 | +4.4 | 2.83 | 1/10 | −24.0 | 0 | 0 | 0 | 10 |

As is clear from the above table, fractions other than the "neutral fraction" have no anti-cancer activity. It is presumed from this fact that the effective materials have not the properties of anions or cations and are neutral organic substances. Carbohydrates are included in this fraction.

(d) Dialysis.—Cellophane paper available on the market was used as semi-permeable membrane.

5 g. of the "EtOH ppt" was dissolved in 10 ml. of water and placed in a cellophane paper bag. The bag was put in 1 liter of water and allowed to stand overnight. Thereafter, the external liquid was removed and 1 liter of water was added again as the new external liquid. Dialysis was continued overnight. The treatment was repeated three times. Each of the external and internal liquids was concentrated under a reduced pressure. The brown external liquid portion, i.e., the dialysable fraction weighed 3.5 g. and the black internal liquid portion, i.e., non-dialysable fraction weighed 0.6 g. The results for anti-cancer activity of these fractions are shown in Table 18.

TABLE 18

| Fractions | Dosage (mg./kg.) | Average body weight change (g.) | Average tumor weight (g.) | Mortality | Tumor inhibition ratio (percent) | Progress of tumor volume | | | |
|---|---|---|---|---|---|---|---|---|---|
| | | | | | | 1 | 2 | 3 | 4 |
| Control | Saline | +2.62 | 3.23 | 1/10 | ---------- | 0 | 0 | 1 | 8 |
| Dialysable fraction | 330 | +0.84 | 2.51 | 1/10 | 22.3 | 0 | 0 | 1 | 8 |
| Non-dialysable fr | 25 | +2.41 | 1.39 | 0/10 | 57.0 | 4 | 2 | 0 | 4 |

Regardless of small dosage, the non-dialysable fraction was effective and the dialysable fraction had no activity. In other words, it is presumed that the active substance has a considerably higher molecular weight. Moreover, the amount of the non-dialysable fraction was about ⅙ of the dialysable fraction and about 7% of the raw material "EtOH ppt" in other experiments. Accordingly, it may be said that the dialysis process is a good concentration and purification process.

We had concluded from the above-mentioned experimental facts as follows:

1. The molecular weight of the active substance was comparatively high.

2. The active substance was not soluble in organic solvents. Therefore, the active substance did not include fats, lipids or oil.

3. It was neither alkaloid nor amino acid. Moreover, it was neither tannic acid nor organic acids.

4. It was non-ionic.

Accordingly, we had deduced that the active substance was protein or polysaccharide. Therefore, we carried out the following experiment.

(e) Removal of protein.—There are many processes for removing protein. We had employed trichloroacetic acid process which at the time we considered to be the most suitable one for our purpose.

non-dialysable fraction was concentrated under a reduced pressure. It was called "passed fraction." The column was again washed with water and then eluted with 0.5 N–NaOH solution. The elute was neutralized with diluent $H_2SO_4$ and dialyzed against running water. The resulting solution was concentrated under a reduced pressure and dried. It was called "absorbed fraction." The passed fraction was 450 mg. of pale brown powder and the absorbed fraction was 550 mg. of black powder. These fractions were examined for their anti-cancer action. Thus obtained results are shown in Table 20 below.

TABLE 20

| Compounds | Dosage (mg./kg.) | Average body weight change (g.) | Average tumor weight (g.) | Mortality | Tumor inhibition ratio (percent) | Progress of tumor volume | | | |
|---|---|---|---|---|---|---|---|---|---|
| | | | | | | 1 | 2 | 3 | 4 |
| Control | Saline | +2.27 | 0.17 | 1/10 | | 0 | 2 | 2 | 5 |
| Passed fraction | 150 | +1.9 | 0.095 | 0/10 | 86.5 | 5 | 1 | 4 | 0 |
| Absorbed fraction | 150 | +2.09 | 1.211 | 1/10 | −73.0 | 0 | 0 | 1 | 8 |

500 mg. of non-dialysable material obtained from the crude extract by dialysis was used. The non-dialysable material was dissolved in 30 ml. of water. By adding 3 g. of trichloroacetic acid to the solution, the protein included was precipitated. The solution was allowed to stand in an ice-chamber for 2 days, and the precipitate was centrifuged. The resulting precipitate was a mere trace. The supernatant was precipitated by adding ethanol in an amount of 8 times as much as the solution. The precipitate contained no protein and the biuret reaction of the precipitate was negative. It gave negative $FeCl_3$ reaction and Liebermann-Burchard reaction. It was strongly positive in Molish-Udransky reaction. Precipitation of protein by use of trichloroacetic acid was so small that anti-cancer activity of the precipitate could not be examined. The results of anti-cancer examination of non-protein fraction are shown in Table 19.

We had succeeded in separating most of the coloring matters from materials possessing anti-cancer activity by use of Duolite S–30 resin in the presence of acetic acid. In the above experiment, non-effective materials of about ½ of the non-dialysable fraction could be removed.

(g) Salting out.—We have shown in (e) that activity is not reduced by removal of protein. However, there are many other processes for removing protein. Here, it is necessary to experiment on the activity of the protein fraction separated. We tested a salting out process with ammonium sulfate with which we could obtain more precipitate than with trichloroacetic acid. However, we observed no activity in the filtrate from which materials had been salted-out. We found that the precipitate itself had strong anti-cancer activity. When protein was removed from this precipitate with acetic acid or trichloroacetic acid, the resulting substances had strong activity. Accordingly, we

TABLE 19

| Compounds | Dosage (mg./kg.) | Average body weight change (g.) | Average tumor weight (g.) | Mortality | Tumor inhibition ratio (percent) | Progress of tumor volume | | | |
|---|---|---|---|---|---|---|---|---|---|
| | | | | | | 1 | 2 | 3 | 4 |
| Control | Saline | +2.27 | 0.7 | 1/10 | | 0 | 2 | 2 | 5 |
| Filtrate | 75 | +2.82 | 0.085 | 0/10 | 88.0 | 2 | 5 | 3 | 0 |

Since such effect was attained with regard to the fraction from which protein was removed, we had concluded that the active substance may be polysaccharide.

(f) Decolorization.—The non-dialysable fraction obtained from the crude extract is colored black. The above-mentioned solution from which protein was removed is colored, too. They could not be decolored even by the use of active charcoal. However, we could effect decolorization well by using resins which selectively absorb organic coloring matter.

1.1 g. of non-dialysable material (dry matter) was dissolved in 50 ml. of water, and mixed with acetic acid to adjust the pH value to 2.5. The solution was filtered. One part of the filtrate was added with trichloroacetic acid, but nothing was precipitated. Accordingly, it was judged that protein was removed by acetic acid. The solution was passed through a column of 50 ml. of Duolite S–30. The column of Duolite S–30 was prepared by activating previously with 1 N-acetic acid. The effluent was decolored and the column was washed with 200 ml. of 1 N-acetic acid. After dialysis of the effluent and the washing by use of cellophane paper to remove acetic acid, the reached the conclusion to the effect that the active substance is fractionated out from the aqueous solution by means of saturation with ammonium sulfate, and it is not protein.

Crude extract prepared from Kuma-sasa (collected in Bandai district) was subjected to dialysis. Dry powder of the resulting non-dialysable substance was used as the starting material. 10 g. of the dry powder was dissolved in 200 ml. of water. The solution was saturated with 165 g. of crystals of ammonium sulfate. The saturated solution was allowed to stand overnight, and a brown precipitate was centrifuged. The precipitate was well washed with a saturated aqueous solution of ammonium sulfate. The precipitate was again dissolved in water, and dialysed against running water by use of cellophane paper to elute inorganic salts. The non-dialysable fraction was evaporated and dried to yield 2 g. of black powder. The mother liquor of salting out was also subjected to dialysis and dried in the same manner. Anti-cancer activities of said two substances were examined and the results are shown in Table 21. The results were confirmed by other experiments, too, as shown in Table 22.

TABLE 21

| Compounds | Dosage (mg./kg.) | Average body weight change (g.) | Average tumor weight (g.) | Mortality | Tumor inhibition ratio (percent) | Progress of tumor volume | | | |
|---|---|---|---|---|---|---|---|---|---|
| | | | | | | 1 | 2 | 3 | 4 |
| Control | Saline | +3.56 | 3.19 | 2/10 | | 0 | 0 | 1 | 7 |
| Ppt | 100 | +3.14 | 1.06 | 0/10 | 95.0 | 7 | 1 | 1 | 1 |
| Filtrate | 100 | +3.15 | 2.15 | 0/10 | 32.5 | 0 | 2 | 1 | 7 |

TABLE 22

| Compounds | Dosage (mg./kg.) | Average body weight change (g.) | Average tumor weight (g.) | Mortality | Tumor inhibition ratio (percent) | Progress of tumor volume | | | |
|---|---|---|---|---|---|---|---|---|---|
| | | | | | | 1 | 2 | 3 | 4 |
| Control | Saline | +5.8 | 1.97 | 1/10 | | 2 | 1 | 0 | 6 |
| Ppt. (B)* | 200 | +4.9 | 0.15 | 0/10 | 92.3 | 5 | 0 | 4 | 1 |
| Ppt. (B) | 25 | +3.9 | 1.55 | 0/10 | 21.3 | 0 | 2 | 1 | 7 |
| Ppt. (T) | 100 | +5.5 | 0.06 | 0/10 | 97.0 | 7 | 1 | 2 | 0 |

*Band T: Sign of lots.

(h) Treatment with lead acetates.—8.5 g. of the non-dialysable substance prepared from the crude extract was dissolved in 100 ml. of water. 10% lead acetate solution was added to the solution with stirring. The precipitate was formed and collected by filtration and washing with water. The precipitate was suspended in water and treated with sulfuric acid. After separation of lead sulfate by filtration, the filtrate was evaporated and dried in vacuo. 1.4 g. of dry powder was obtained as the fraction of precipitation by lead acetate. The filtrate obtained by treatment with lead acetate was then mixed with 5% of lead subacetate solution and the formed precipitate was collected by filtration and washing with water. The precipitate was suspended in water and lead ions were removed by treatment with sulfuric acid. 0.7 g. of dry material was yielded as the fraction of lead subacetate. The filtrate obtained by treatment with lead subacetate was treated with sulfuric acid to remove lead ions by means of the same process. 2.0 g. of colorless dry powder was yielded as the fraction of non-precipitation by lead salts.

The results for anti-cancer activities of said three fractions are shown in Table 23. We have shown that the effective material was not precipitated from the water solution by treatments of lead acetate.

(5) The active substance is decolored by treatment with a resin.
(6) The active substance is salted out.
(7) The active substance is not precipitated by treatment with lead acetate.

We have tried the following process.

The dried raw material was cut and extracted with hot water to prepare the crude extract. It is not necessary to dry the crude extract in order to subject it to the next operation. The resulting concentrate of the crude extract was subjected to dialysis against running water. The non-dialysable part was salted out by saturating with ammonium sulfate. The precipitate was centrifuged and dissolved in water, and subjected again to dialysis to remove inorganic salts. The non-dialysable solution was made acidic with acetic acid. After removing protein by centrifugation, the resulting solution was passed through a column of resin which is suitable for decoloring, such as Duolite S-30 to remove most of coloring matter by absorption. The effluent was concentrated and mixed with ethanol to form a precipitate. The objective material is this precipitate. Since it contained ash, de-ionization was carried out by use of ion exchange resins. Details are described in the examples later. For removal of protein,

TABLE 23

| Compounds | Dosage (mg./kg.) | Average body weight change (g.) | Average tumor weight (g.) | Mortality | Tumor inhibition ratio (percent) | Progress of tumor volume | | | |
|---|---|---|---|---|---|---|---|---|---|
| | | | | | | 1 | 2 | 3 | 4 |
| Control | Saline | +3.56 | 3.19 | 2/10 | | 0 | 0 | 1 | 7 |
| Precipitate by lead acetate | 100 | +2.28 | 4.36 | 2/10 | −45.1 | 0 | 0 | 1 | 7 |
| Precipitate by lead subacetate | 100 | +3.11 | 3.09 | 0/10 | 3.1 | 0 | 0 | 3 | 7 |
| Non-precipitate by lead salts | 100 | +3.04 | 1.93 | 1/10 | 39.6 | 2 | 1 | 0 | 6 |

(III) Purification process—One systematic process is composed of by arranging appropriately processes mentioned in (II). We have shown the following facts from many experiments up to the present.

(1) The active substance is not soluble in organic solvents such as alcohol, ether and the like.
(2) The active substance is non-ionic.
(3) The active substance is non-dialysable.
(4) The active substance is not a protein.

as mentioned above, acetic acid or a mineral acid may be used in place of trichloroacetic acid. In other experiments, a fraction precipitated with ammonium sulfate was dissolved in water and added with trichloroacetic acid, and the resulting precipitate, that is protein fraction was compared in regard to anti-cancer activity with the filtrate, i.e., the non-protein fraction. The results are shown in Table 24.

TABLE 24

| Compounds | Dosage (mg./kg.) | Average body weight change (g.) | Average tumor weight (g.) | Mortality | Tumor inhibition ratio (percent) | Progress of tumor volume | | | |
|---|---|---|---|---|---|---|---|---|---|
| | | | | | | 1 | 2 | 3 | 4 |
| Control | Saline | +5.8 | 1.97 | 0/10 | | 2 | 1 | 0 | 6 |
| Protein | 100 | +4.4 | 1.01 | 0/10 | 48.6 | 0 | 2 | 1 | 7 |
| Non-protein | 100 | +5.2 | 0.05 | 0/10 | 97.5 | 7 | 2 | 1 | 0 |
| HOAc-filtrate | 100 | +4.9 | 0.20 | 0/10 | 90.0 | 7 | 0 | 1 | 2 |

From these results, it is confirmed again that the protein fraction has no anti-cancer activity but the non-protein fraction has strong activity.

A process omitting dialysis is explaned as another process. The solution of the crude extract is made acidic by use of sulfuric acid and the like, thereby to precipitate some cations and proteins. The precipitate is removed. The filtrate is immediately saturated with ammonium sulfate to carry out salting-out. The precipitate is centrifuged, and dissolved in water. Thereaftre, inorganic salts included are removed by use of a strongly acidic ion exchange resin and a strongly basic ion exchange resin. The resulting neutral effluent is mixed with acetic acid. Then, the solution is passed through a column of resin, such as Duolite S-30, whereby decolorization is carried out. The decolored solution is concentrated under a reduced pressure and added with a solvent such as ethanol, methanol, or acetone to yield solid powder.

Of course, the objective material can be obtained by various combinations other than the above process. If necessary, it may be to carry out the same operation repeatedly. The yields of the products prepared by these processes are shown in Table 25. The yield changes depend upon the kind of raw material, the period of collection and other conditions.

| Crude extract from Kuma sasa (g.) | Final product (g.) | Yield (percent) |
|---|---|---|
| 600 | 3.0 | 0.5 |
| 600 | 1.7 | 0.28 |
| 590 | 6.1 | 1.03 |

(IV) Properties.—The final material obtained is a colorless or grey amorphous powder and it contains occasional traces of impurities such as coloring matters, ash, and nitrogen containing substances. We studied the properties of the final material purified as much as possible.

The present material is soluble in water, and hardly soluble in organic solvents such as ethanol, methanol, acetone, ether, petroleum ether, chloroform and benzene. The material is non-dialysable, precipitated by salting out and is a non-ionic substance. It gives a negative biuret reaction and ninhydrin reaction, and amino acids cannot be confirmed. Then, detection of amino acids was carried out by paper partition chromatography on a hydrolyzate of this material, but it was unsuccessful. Accordingly, it was confirmed that protein is not present in the final material. It gives negative $FeCl_3$ reaction to phenolic substances such as tannic acid and the like and also gives negative Liebermann Burchard's reaction to steroids, and saponin-glycoside. Since a characteristic absorption maximum is not observed at more than 220 millimicrons in an ultraviolet absorption spectrum, flavone glycoside, protein, and nucleotide are not present in the final product. The product gives intensive positive Molisch-Udransky reaction, and anthrone-$H_2SO_4$, orcinol-HCl, phenol-$H_2SO_4$ and tryptophan-$H_2SO_4$ reactions. However, it gives negative Fehling's, Benedict's, and Tollen's reactions. Moreover, it gives negative Elson-Morgan reaction and positive carbazole-$H_2SO_4$ reaction.

Figure 2:
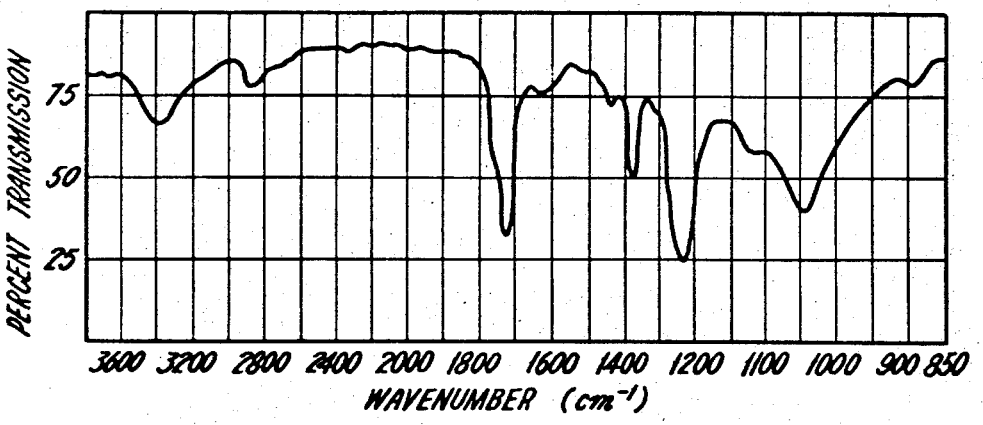

Accordingly, it may be concluded from these properties that the substance which we obtained is a polysaccharide. It is also proved by infrared spectrum. FIG. 1 is the absorption pattern and FIG. 2 is that of the acetyl derivative. In case of the acetyl derivative, absorption assigned to OH in FIG. 1 is lost.

FIG. 1 shows adsorption at 3480 cm.$^{-1}$ assigned to OH which is lost by acetylation. FIG. 2 shows adsorption assigned to acetyl at 1235, 1380 and 1735 cm.$^{-1}$.

Acetylation: 1 g. of the polysaccharide was dissolved in 80% pyridine in an amount of 5 times as much as the polysaccharide. The solution was gradually mixed with a mixture of pyridine in an amount of 5 times and acetic anhydride in an amount of 10 times with stirring, thereby to react at 80° C. on a water bath for 4 hours. After the reaction mixture was poured into crushed ice, it was mixed with chloroform and shaken. The chloroform layer was separated and washed with water and dried with anhydrous sodium sulfate. After evaporating the chloroform, petroleum ether was added. The precipitate was collected and dried. 1.25 g. of amorphous white powder was obtained. Analytical data for the aceyl derivative are described earlier.

(V) Hydrolysis.—We carried out the hydrolysis to determine the monosaccharides constituting the polysaccharide.

5 mg. of the present substance was dissolved in 0.5 ml. of 1 N-$H_2SO_4$. The resulting solution was put in a sealed tube and hydrolysis was carried out for 5 hours in boiling water. After cooling, barium carbonate was added therein to neutralize the solution and filtered. The filtrate was used for examination.

Paper partition chromatography of the hydrolysate was carried out. No. 51 filter paper produced by Toyo Roshi Co. was used, and the paper partition chromatography was carried out by the ascending method. As solvents, the following three systems were employed.

1. ethyl acetate:pyridine:water (2:1:2)
2. ethyl acetate:acetic acid:water (3:1:3)
3. phenol:water (5:1)

Various spray reagents were used for detection and the result is shown in Table 26.

TABLE 26

| Solvent system | Spot (1) | Spot (2) | Spot (3) | Spot (4) |
|---|---|---|---|---|
| No. 1 | 0.38 | 0.33 | 0.235 | 0.025 |
| No. 2 | 0.265 | 0.22 | 0.14 | 0.13 |
| No. 3 | 0.54 | 0.44 |  | 0.12 |

It was found that the hydrolysate contains four kinds of monosaccharide. Various reagents were sprayed by use of solvent system 1, and the results as shown in Table 27 were obtained.

TABLE 27

| Reagents | Rf=0.38 | Rf=0.33 | Rf=0.235 | Rf=0.025 |
|---|---|---|---|---|
| Ammoniac $AgNO_3$ | +. | +. | +. | +. |
| m-Phenylenediamine | +. | +. | +. | ±. |
| Anilin hydrogen phthalate. | Red. | Red. | Brown. | Brown. |
| Anisidine-HCl | Reddish brown. | Reddish brown. | Yellowish brown. | Red. |
| Resorcinol-HCl | Greyish blue. | Greyish blue. |  | Blue. |
| Anthrone-$H_3PO_4$ |  |  |  |  |
| Ninhydrin |  |  |  |  |

From this table, it was found that two aldopentoses, one aldohexose and a small amount of uronic acid are contained in the hydrolysate. It was deduced from the Rf-values that the aldoses are xylose, arabinose and galactose. Paper partition chromatography was carried out using authentic samples, and the results were confirmed to be right.

Further study was carried out on the paper chromatogram as explained hereinafter, in order to define the proportions of the main monosaccharides constituting the present substance. Paper chromatgoraphy was carried out by use of a solvent system comprising ethyl acetate:pyridine:water (2:1:1) containing 0.15 N $AgNO_3$ in accordance with the ascending method. After development, the resulting paper was air-dried and allowed to stand for 1 hour in a closed vessel in which a little ammonia was present. Thereafter, it was heated at 80° C. for 20 minutes. Brown spots appeared. Distinction of the spot was measured by the densitometer, and compared with a standard one prepared by mixing authentic monosaccharides (xylose, arabinose and galactose) in various ratios. It was found that the present substance comprises mainly xylose, arabinose and galactose at the molecular ratio of approximately 1:1:1.

Ion exchange chromatography was also carried out. Saccharides are easily combined with boric acid or borate and converted into borate complexes having a negative charge. Ion exchange chromatography of monosaccharides contained in the hydrolysate of the present substance was carried out by utilizing this principle.

As the ion exchange resin, a choline type ion exchange resin Dowex-1 (Dow Chemical Co.) was used. The column was washed with 1N-HCl, and 0.1 M potassium tetraborate ($K_2B_4O_7$) was passed through. The borate solution was passed through until no chlorine ions were present. After preparing the ion exchange resin in borate form, the ion exchange resin was washed well with water. A sample was prepared by dissolving 25 mg. of the present substance in 1 ml. of 1 $N-H_2SO_4$, heating the solution on boiling water for 5 hours, removing acids from the reaction solution by use of 5 ml. of secondary amine type ion exchange resin, Dowex 3 (Dow Chemical Co.), and drying by evaporation. The dry sample was dissolved in 10 ml. of 0.01 M potassium tetraborate. The solution was passed through the column, and thereafter the column was eluted with potassium tetraborate. One fraction was made by collecting the elute in an amount of 20 ml. The monosaccharide in each fraction was detected by the orcinol-HCl method and the anthrone-$H_2SO_4$ method. Estimation was carried out by means of an electrophotometer with a red filter. From the result, the presence of xylose, arabinose and galactose was proved. It was confirmed in this experiment that the approximately proportion of xylose, arabinose and galactose is 1:1:1 which accords with the result of the paper partition chromatography.

(VI) Anti-cancer activity of the purified polysaccharide.—Anti-cancer activity of the purified polysaccharide (SPS) prepared from Sasa albo-marginata L. in Example 1 on the transplanted tumors in mice is examined by comparing it with the activity of Mitomycin C which is on the market.

Tumors.—The following tumors were employed: Both solid and ascites forms of Ehrlich carcinoma, the solid form of sarcoma-180, ascites MH–129–E in C3H strain and Friend virus disease carried in DD/albino mice. The transplantable mouse disease discovered by C. Friend about 6 years ago is caused by a virus.

Method on ascitic tumors.—Freshly aspirated ascitic fluid of Ehrlich carcinoma and MH–129–E one week after inoculation was injected in 0.2 ml. doses intraperitoneally into groups of 10 mice. The ascitic fluid injected contained approximately 6 million cells in 0.2 ml. Treatments were begun 24 hours after and 10 days before the inoculation of ascitic fluid and continued once daily. The average survival of each group was used as the criterion in judging the effect of the tested substances.

Method on Friend virus disease.—0.2 ml. of a 10 percent saline suspension of Friend virus injected spleens was injected intraperitoneally into mice, taking 10 mice for a group. Treatments were begun 24 hours after and 10 days before the injection of the spleen homogenate and continued once daily. The effects of the compounds were evaluated by comparing the average weights of spleens in treated and untreated infected mice 3 weeks after injection of the spleen homogenate.

Method on subcutaneous tumors.—0.2 ml. of ascitic fluid of 1 week old Ehrlich carcinoma and sarcoma-180 containing approximately 12 million cells was injected subcutaneously in the inguinal region of female DD albino mice weighing about 20 g. Treatments by intraperitoneal injection were begun 1 day and 5 days postimplantation and carried out every other day.

The tumors were measured every several days with a caliper and the volume was calculated approximately. On the 29th day the mice were autopsied, and body weight and tumor weight were measured. The inhibition ratio was calculated from the average tumor weights of the treated groups by comparison with those of a control group. For the purpose of expressing progress of the growth of the tumors, the tumor sizes of mice in each group measured on the 29th day were compared with those measured on the 11th day, and estimations of regression, decrease, unchange and increase were made.

Results: Ascites tumors.—The data on Ehrlich ascites carcinoma and MH–129–E are shown in Table 28. Both treatments which were begun 10 days before and 24 hours after the inoculation of ascitic fluid, by intraperitoneal injection of SPS in doses of 100 mg./kg., failed to inhibit growth of the tumors or to induce prolongation of life, with the exception of one mouse in 20 mice treated. Ascitic fluid of this mouse increased gradually up to about the 20th day, but thereafter it decreased gradually and finally regressed.

TABLE 28.—EFFECT OF SPS ON EHRLICH ASCITES CARCINOMA IN DD STRAIN AND ON MH–129–E ASCITES HEPATOMA IN C3H STRAIN

| Compounds | Dosage (mg./kg.) | Treatment begun | Ehrlich ascites carcinoma | | | MH–129–E | | |
|---|---|---|---|---|---|---|---|---|
| | | | Sex | Number of mice | Average survival (days) | Sex | Number of mice | Average survival (days) |
| Controls | Saline | 1st day | F | 10 | 13.4 | M | 5 | 32.5 |
| | | | | | | F | 5 | 25.4 |
| SPS | 100 | 10 days before | F | 10 | 12.2 | M | 5 | 14.6 |
| | | | | | | F | 5 | 14.2 |
| SPS | 100 | 1st day | F | 10 | >12.8 | M | 5 | 16.8 |
| | | | | | | F | 5 | 19.4 |

Friend virus disease.—Intraperitoneal injection of SPS at a dose level of 100 mg./kg. induced no inhibitory effect on this virus leukemia in both treatments begun 10 days before and 24 hours after the injection of the spleen homogenate. On the contrary, Mitomycin C had a destructive effect on this disease as seen in spleen weight.

TABLE 29—EFFECT SPS AND MITOMYCIN C ON FRIEND VIRUS DISEASE

| Compounds | Dosage (mg./kg.) × (No. doses) | Average body weight change (g.) | Average weight of spleen (g.) | Mortality | Inhibition ratio (percent) |
|---|---|---|---|---|---|
| Controls | Saline | +2.7 | 3.0 | 0/10 | |
| SPS | 50×13 [1] | +0.9 | 3.7 | 4/10 | −23 |
| SPS | 50×13 [2] | +2.9 | 3.0 | 5/10 | 0 |
| Mitomycin C | 1.8×13 [2] | +0.7 | 0.6 | 1/10 | 80 |

[1] Treatment was begun 10 days before implantation.
[2] Treatment was begun 1 day after implantation.

Subcutaneous tumors.—The tumors which were most responsive to SPS were subcutaneous Ehrlich carcinoma and sarcoma-180. As shown in Table 30, complete regression of subcutaneously implanted 1 day and 5 days old Ehrlich carcinoma occurred in 90% and 60% of mice treated with 200 mg./kg. of SPS, respectively. Also inhibitory effects were noticed in doses of 25–100 mg./kg. of SPS on both 1 and 5 day old tumors. In contrast, no complete regression of 1 and 5 day old tumors occurred in mice treated with Mitomycin C.

similar to that of our polysaccharide; solid tumor resorption, necrosis without hemorrhage and ineffectiveness on TABLE 30.—EFFECT OF SPS AND MITOMYCIN C ON SUBCUTANEOUSLY IMPLANTED EHRLICH CARCINOMA

| Compounds | Dosage (mg./kg. × No. doses) | Treatment begun on the— | Average body weight change (g.) | Average tumor weight (g.) | Mortality | Tumor inhibition ratio (percent) | Progress of tumor volume | | | |
|---|---|---|---|---|---|---|---|---|---|---|
| | | | | | | | 1 | 2 | 3 | 4 |
| Controls | Saline | 1st day | +2.5 | 3.22 | 1/10 | | 0 | 0 | 1 | 8 |
| SPS | 200×14 | 1st day | +0.8 | 0.19 | 0/10 | 94 | 9 | 0 | 0 | 1 |
| SPS | 200×12 | 5th day | +0.5 | 1.01 | 0/10 | 69 | 6 | 1 | 1 | 2 |
| Controls | Saline | 1st day | +3.6 | 1.97 | 1/10 | | 0 | 0 | 3 | 6 |
| SPS | 100×15 | 1st day | +1.8 | 0.58 | 0/10 | 71 | 4 | 3 | 2 | 1 |
| SPS | 50×15 | 1st day | +1.7 | 0.55 | 0/10 | 72 | 2 | 3 | 1 | 4 |
| SPS | 25×15 | 1st day | +2.0 | 0.37 | 1/10 | 82 | 2 | 1 | 4 | 2 |
| SPS | 100×13 | 5th day | +3.1 | 0.38 | 0/8 | 81 | 3 | 3 | 1 | 1 |
| SPS | 50×13 | 5th day | +1.0 | 0.87 | 0/8 | 56 | 2 | 1 | 3 | 2 |
| Mitomycin C | 1.8×15 | 1st day | +1.5 | 1.24 | 1/9 | 37 | 0 | 1 | 3 | 4 |
| Do | 1.8×13 | 5th day | +1.5 | 2.26 | 0/9 | −14 | 0 | 0 | 1 | 8 |

Subcutaneous sarcoma-180 was more responsive to SPS then Ehrlich carcinoma. As shown in Table 31, complete regression of 1 and 5 day old tumors occurred in 80% and 60% of mice treated with 100 mg./kg. of SPS respectively, and the inhibition ratios were 97% and 98% respectively. In the same experiment, complete regression of 1 day old sarcoma-180 occurred also in 50% of the mice treated with 1.8 mg./kg. of Mitomycin C and the inhibition ratio was 85%, but, in contrast, no complete regression was observed on 5 day old sarcoma-180 with Mitomycin C. During the first 9 days the average volume of the tumor was almost essentially the same for the treated groups and untreated control group. After the 9th day, regressions were noted in all the treated groups. Changes in group-average volume of tumors were observed in SPS-treated mice with regression of tumor, in Mitomycin C treated mice with no regression of 5 day old tumor and in control mice with progressively growing tumor.

There was no weight loss in all the SPS treated groups with the doses of 25–200 mg./kg. and also no microscopic evidence of damage to important tissues, and the hemorrhage which is so marked a feature of tumor response to bacterial polysaccharides was absent.

ascites tumors. Also Diller et al. concluded upon the mechanism of action of these substances that tumor resorption and necrosis occur through an apparent host-mediated reaction which involves stimulation of phagocytic elemnts of liver and spleen. In our studies also the treatment with SPS showed no influence on takes or growth of the subcutaneous tumors for the first 9 days after transplantation. The substance does not seem to act directly on tumor cells but through some unknown substance which is produced secondarily in animal bodies.

Thus the mechanism of action of SPS does not appear to be the same as that involved in direct tumor destruction by bacterial polysaccharides reported previously by many authors. Also it may differ from the polysaccharides isolated by Belkin et al. from higher plants which induced damage of ascites sarcoma-37.

The following examples are shown not for limitation of the scope of the present invention but for illustration of the present invention.

Example 1

Dry leaves of sasa-grass (Sasa albo-marginata) collected in Okunikko in December 1962 was crushed and 390 kg. of it was heated in 3 ts. of water at 60–80° C.

TABLE 31.—EFFECT OF SPS AND MITOMYCIN C ON SUBCUTANEOUSLY IMPLANTED SARCOMA-180

| Compounds | Dosage (mg./kg. × No. doses) | Treatment begun on the— | Average body weight change (g.) | Average tumor weight (g.) | Mortality | Tumor inhibition ratio (percent) | Progress of tumor volume | | | |
|---|---|---|---|---|---|---|---|---|---|---|
| | | | | | | | 1 | 2 | 3 | 4 |
| Controls | Saline | 1st day | 0 | 2.63 | 1/9 | | 0 | 0 | 0 | 8 |
| SPS | 100×15 | 1st day | +0.7 | 0.1 | 0/9 | 97 | 8 | 1 | 0 | 0 |
| SPS | 100×13 | 5th day | +2.3 | 0.07 | 0/9 | 98 | 6 | 3 | 0 | 0 |
| Mitomycin C | 1.81×5 | 1st day | +1.3 | 0.4 | 0/10 | 85 | 5 | 2 | 1 | 2 |
| Do | 1.8×13 | 5th day | +1.6 | 1.89 | 0/9 | 28 | 0 | 2 | 2 | 5 |

The most significant aspect of these studies is the high percentage of regression of subcutaneous sarcoma-180 and Ehrlich carcinoma in mice treated by intraperitoneal injection of SPS with low toxicity. In contrast, it had no effect on the ascites form.

There are only a few reports of polysaccharides which do not affect ascitic tumor cells or damage solid tumors without hemorrhage in tumor tissue. Lazal et al. reported the oncolytic effect of methylcellulose on Murphy-Sturm lympho-sarcoma in Sprague-Dawley rats. In their experiments, the injection had no effect on takes or growth of the tumor for the first 10 days after transplantation, and then between the 17th and 21st days after transplanation there were many complete regressions. As the mechanism of action of this substance, they say that methylcellulose stimulates the function of the reticuloendothelial system and a possible explanation of the inhibition of tumor growth may lie in an alteration of the immune responses in the treated animals in such a way as to enhance rejection of the tumor homograft. Recently, Diller et al. also reported the oncolytic activity of the yeast polysaccharides, Zymosan and hydroglucan, with significant effects on dubcutaneous sarcoma-37, sarcoma-180 and Krebs-2, but no effect on their ascites forms. The oncolytic property of these yeast polysaccharides is most with vigorous stirring for about 8 hrs. After filtration of the extracted solution, the liquor was concentrated to about 160 liter under a reduced pressure and then filtered by adding 12 kg. of filter aid. The filtrate was dialysed against running water and the non-dialysable liquor was concentrated to about 40 liters. The concentrate was saturated with ammonium sulfate and allowed to stand overnight. The precipitate formed was separated by centrifugation and washed twice with the saturated ammonium sulfate solution. The precipitate was dissolved in 40 liter of water and then the liquor was dialysed against running water. The non-dialysable liquor was concentrated to 42 liter and then 3 liter of acetic acid was added in the concentrate and allowed to stand overnight. The liquor was centrifuged and the supernatant was passed through a column of Duolite S–30 resin. The effluent was filtered, concentrated to about 5 liter, and 4 volumes of ethanol were then added to the concentrate and allowed to stand overnight. Seventy grams of gray brown amorphous powder was obtained. The crude powder was dissolved again in 2 liters of distilled water and insoluble matters were filtered. The filtrate was passed through columns of Amberlite IR–120 resin (H-foam, 700 ml.) and then Amberlite IRA–410 resin (OH-form, 1000 ml.). The effluent was concentrated under a reduced pressure and 4 volumes of ethanol were added to the concentrate and allowed to stand overnight. The precipitate formed was centrifuged and washed with ethanol and ether. Fourteen grams of gray powder was obtained which gave distinct positive Orcinol, Molisch-Udransky, and Anthrone reactions, but negative Fehling, Tollens, Elson-Morgan and ninhydrin reactions. It is easily soluble in water and insoluble in conventional organic solvents. The substance was analysed as follows; C, 44.6%; H, 5.94%; N, 0.75%; ash, 2.1%.

Example 2

Fresh leaves of sasa-paniculata were finely cut. 30 kg. of the cut leaves were added to 200 liter of water and boiled with stirring. In accordance with leaching, the liquid became acidic, therefore powdered calcium hydroxide was added frequently, to maintain the liquid neutral. After about 3 hours, the liquid was stood and the residue was filtered. The extract was extracted again with 100 liter of water. 400 g. of calcium hydroxide was required for the all extracting processes. The extracts were mixed and evaporated under a reduced pressure to about 20 liters. The product was the crude extract. Then, the extract was mixed with dilute sulfuric acid to make the pH 3.5. Calcium salts and protein were precipitated. They were removed by filtration. The filtrate was added with a dilute sodium carbonate solution with stirring. The solution was neutralized. Then, powdered ammonium sulfate was added to the solution, and saturated with stirring. After standing the solution overnight, it was filtered. The separated dark brown precipitate was collected. The precipitate was dissolved again in about 7 liters of water. The solution was filtered once to remove impurities, and then the filtrate was saturated with ammonium sulfate. Salting out was repeatedly carried out.

After the resulting material was washed with the saturated ammonium sulfate solution, it was dissolved in about 3 liters of distilled water, and passed through a column of strong acidic ion-exchange resin and strong basic ion-exchange resin to remove completely inorganic salts. The effluent was added with glacial acetic acid to adjust the concentration to about 1 N. The small amount of precipitate of protein was carefully filtered off. Then, the filtrate was passed through a column of Duolite S-30 resin. The effluent was concentrated under a reduced pressure to 200 ml. 800 ml. of acetone was added to the solution. After filtering the precipitate, the resulting precipitate was washed well with water-containing acetone (80%) and then with anhydrous acetone, and dried. 5.5 g. of dark powder was obtained; N, 1.3%; ash, 3.5%.

Example 3

3.3 kg. of wheat straw was mixed with 45 liters of water and boiled at 90–95° C. for 6 hours with stirring. The extract was filtered off and concentrated under a reduced pressure to 2.3 liters. The concentrate was subjected to dialysis for 45 hours by use of cellophane paper, and thereafter concentrated to 750 ml. The concentrate was saturated with ammonium sulfate. After standing the solution overnight, the dark brown precipitate was collected by centrifugation. The precipitate was dissolved again in 500 ml. of water and impurities were removed by filtration. The filtrate was saturated again with ammonium sulfate. The resulting precipitate was washed well with a saturated ammonium sulfate solution and dissolved in 750 ml. of distilled water. The solution was passed through columns of strong acid ion-exchange resin and then strong basic ion-exchange resin to remove completely inorganic salts. The effluent was mixed with 40 ml. of glacial acetic acid to make the concentration about 1 N. Careful filtration treatment was carried out to filter off the precipitated protein fraction. Thereafter, the filtrate was passed through a column of resin, Duolite S-30, and the effluent was concentrated under a reduced pressure to 100 ml. After filtration of the concentrate 400 ml. of acetone was then added to the concentrate. Then, the precipitate formed was filtered, washed well with 80% acetone and then with anhydrous acetone, and dried. 2.4 g. of grey powder was obtained; N, 1.1%; ash, 1.8%.

Example 4

6 kg. of molasses was subjected to dialysis against running water by use of cellophane paper. The non-dialysable solution was concentrated under a reduced pressure to yield about 1 liter of dark brown solution. A small amount of impurities was filtered, and the filtrate was saturated with about 1.5 kg. of ammonium sulfate. After allowing the solution to stand overnight, the precipitate formed was collected by contrifugation. Then, the precipitate was washed twice with the saturated ammonium sulfate aqueous solution. The resulting dark brown precipitate was dissolved in about 200 ml. of water to make a muddy form. The solution was put in cellophane paper and subjected to dialysis against running water for 72 hours. About 3 liters of the non-dialysable solution was obtained. Filtration was carried out once to yield a cellular filtrate. The filtrate was mixed with 200 ml. of acetic acid, and the mixture was again filtered. The solid protein formed at that time was very small. Then, the filtrate was passed through a column of Duolite A-7 (800 ml.) conditioned with 1 N-acetic acid, whereby coloring matter was absorbed. The effluent was concentrated at a low temperature to about 500 ml. The concentrated solution was mixed with 12 g. of neutral lead acetate, whereby a brown precipitate was formed. The precipitate was removed by centrifugation. 10% of sodium carbonate solution was added in the supernatant to adjust the pH value to about 8.0. The lead carbonate was precipitated. The precipitate was filtered off. The solution was passed through columns of 25 ml. of ion-exchange resin, Amberlite IR-120, and then 50 ml. of IRA-410. The pH value of the light yellowish brown effluent was about 7. The effluent was concentrated under a reduced pressure to 100 ml. The concentrate was mixed with 400 ml. of ethanol with stirring. The separated precipitate was filtered and dried, to yield 0.9 g. of grey powder.

The Pb-ion in the product was negative. The product contained traces of nitrogen and ash. Detection of monosaccharide was also negative; N, 0.5%; ash, 0.1%.

Example 5

10 kg. of bagasses (produced from the sugarcane, *Saccharum officinarum* L.) was extracted with 80 liters of boiling water for 6 hours with stirring. The extracted solution was filtered off and concentrated under a reduced pressure to about 5 liters. The concentrate was subjected to dialysis for 2 days by use of cellophane paper, and then the non-dialysable solution was concentrated to 1.3 liters. The concentrate was saturated with ammonium sulfate. After allowing to stand overnight, the solution was contrifuged. The dark brown precipitate obtained was dissolved in 1 liter of water and a little insoluble material was removed by filtration. The clear filtrate was saturated again with ammonium sulfate. The salting out process was repeatedly carried out. The resulting precipitate was washed well with a saturated ammonium sulfate solution and dissolved again in 1 liter of water. The solution was passed through columns of acidic and basic ion-exchange resins to remove inorganic salts. The effluent was mixed with 65 ml. of glacial acetic acid. Filtration was carried out to remove the precipitate. The filtrate was passed through a column of resin, Duolite S-30, and Dowex-3 (Dow Chemical Co.) by which acetic acid was removed from the solution. The pH value of the effluent was about neutral. The effluent was concentrated under a reduced pressure to 300 ml. 1.2 liters of methanol was added to the concentrate. The precipitate was filtered, washed with 80% of methanol and then absolute methanol, and dried. 0.43 g. of grey powder was obtained; N, 0.35%; ash, 0.15%.

Example 6

1 kg. of cut rice plant, Oryza sativa L., was added to about 20 liters of water, and heated at 80–95° C. for 5 hours with stirring. After filtering the mixture, the filtrate was concentrated under a reduced pressure to 0.9 liter. Then, hydrochloric acid was added therein to make the solution at pH 4.0. The precipitate formed was removed by filtration. The filtrate was passed through a column of 400 ml. of Amberlite–200 and a column of 600 ml. of Amberlite IRA–410. The effluent was concentrated under a reduced pressure to 510 ml. and the concentrate was mixed with amonium sulfate with stirring to saturate. After the saturated solution was allowed to stand overnight in an ice-chamber, it was centrifuged and the precipitate was washed twice with the saturated ammonium sulfate solution. Then, the precipitate was dissolved in about 500 ml. of water and subjected to dialysis against running water by use of cellophane paper for 2 days. The non-dialysable solution was concentrated under a reduced pressure to make 37 ml. 140 ml. of methanol was added therein and the precipitate formed was collected by centrifigation. 0.25 g. of grey polysaccharide was obtained; N, 1.32%; ash, 2.8%.

Example 7

10 kg. of bagasses was extracted with 150 liters of water at the temperature 60–85° C. for 4 hours with stirring. The extract was filtered and concentrated under a reduced pressure to about 3 liters. The concentrate was acidified by adding sulfuric acid to make pH 3.8 and the precipitate formed was removed by filtration. The filtrate was saturated with ammonium sulfate and allowed to stand overnight. The precipitate was removed by centrifugation and washed twice with a saturated ammonium sulfate solution. After dissolving the precipitate in 1 liter of water, the solution was passed through a column of 500 ml. of Amberlite–200 and a column of 500 ml. of Amberlite IRA–410. The effluent was concentrated under a reduced pressure to make 110 ml. 440 ml. of ethanol was added to the concentrate. This step was repeated twice and the product was finally washed with 95% ethanol and ether respectively, and dried. 2.68 g. of white powder was obtained; N, 0.12%; ash, 0.86%.

Example 8

10 kg. of dried leaves and stems of corn, Zea mays L. were crushed and mixed with 150 liters of water. The mixture was heated at 80–100° C. for 4 hours with stirring. Acidification, salting out and deionization with ion-exchange resins were done in the same manner as described in the Example 7. The effluent was concentrated to make 2.5 liters. After addition of 170 ml. of acetic acid, the solution was passed through a column of the resin which was prepared by conditioning Duolite S-30 with 1 N-acetic acid. The decolored effluent was subjected to dialysis for 2 days and then concentrated under a reduced pressure to about 70 ml. 280 ml. of methanol was added therein and the formed precipitate was centrifuged and dried. 1.65 g. of white polysaccharide was obtained; N, 1.13%; ash, 1.3%.

Example 9

10 kg. of dried leaves of kuma-sasa, Sasa albomarginata Makino et Shibata, were cut and mixed with 140 liters of water. The mixture was heated at 60–90° C. for 4 hours with stirring. Acidification and salting out of the extract were done in the same manner as described in Example 7. The precipitate by saturating with ammonium sulfate was dissolved in 1 liter of water and subjected to dialysis against running water by use of cellophane paper for 2 days. The non-dialysable solution was concentrated to make about a half. The saturated solution of lead acetate was then added drop-wise into the concentrate until no more precipitate was formed. After being allowed to stand for 4 hours, the precipitate was separated by centrifugation. The dilute sulfuric acid solution was added with stirring into the supernatant until its pH became 4.0. The mixture was filtered to get a clear solution and the filtrate was passed through a column of 500 ml. of Amberlite–200 and a column of 500 ml. of Amberlite IRA–410. The effluent was concentrated under a reduced pressure to make 60 ml. and 4 volumes of methanol was added into the concentrate. 1.8 g. of grey amorphous powder was obtained; N, 0.45%; ash, 1.4%.

Example 10

1.3 kg. of commercial cane molasses was diluted with water to twice its volume and dilute sulfuric acid solution was added into it to make pH 3.5. After allowing to stand overnight, the precipitate formed was filtered off and ammonium sulfate was added to the filtrate to saturate it. After allowing to stand overight, the precipitate was removed by centrifugation and the precipitate separated was washed twice with the saturated ammonium sulfate solution. Then the precipitate was dissolved in 800 ml. of water. The solution was passed through a column of 150 ml. of Amberlite–200 and a column of 500 ml. of Amberlite–200 and a column of 500 ml. of Amberlite IRA– 410. The effluent was concentrated under a reduced pressure to 70 ml. and 4 volume of methanol was added into it. 1.1 g. of grey amorphous powder was obtained; N, 0.8%; ash, 1.2%.

As will be apparent from the foregoing. the steps in the process for production of a polysaccharide are each carried out on a solution containing the desired product, whether the solution is the initial stock or whether it is the solution resulting from a previous treatment step.

What we claim is:

1. A process for the production of a polysaccharide which comprises treating a stock selected from the group consisting of molasses and raw sugars prepared from sugarcane and the liquor extracted by hot water from the leaves and stems of plants of the family Gramineae, the treatment comprising in any order the three steps of:
   (1) acidifying to a pH in the range of 3–4 with a mineral acid, acetic acid or trichloroacetic acid and discarding the precipitate formed;
   (2) salting out by saturating with ammonium sulfate; collecting the precipitate and dissolving it in water to form a solution for subsequent treatment; and
   (3) deionizing by passage through a column of a strongly acidic cation exchange resin and a column of a strongly basic anion exchange resin and collecting the effluent, and concluding the treatment by isolating the polysaccharide.

2. A process for the production of a polysaccharide according to claim 1 wherein the treatment includes the step of dialysing against water and retaining the non-diffusate for subsequent treatment.

3. A process according to claim 1 wherein the treatment includes adding an aqueous solution of lead acetate, discarding the precipitate formed, adding a water soluble acid having an anion which forms an insoluble lead salt and discarding the further precipitate formed.

4. A process according to claim 1 wherein the treatment includes passing the solution being treated in acidic form through a column of decolorizing resin.

5. A process according to claim 1 wherein the treatment is concluded by adding a water-miscible organic solvent to the treated solution and collecting the polysaccharide precipitated.

6. A process according to claim 1 which includes preparing the stock by extraction from the leaves and stems of plants of the family Gramineae with water at a temperature of 60–100° C., filtering and concentrating.

7. A product produced according to the process of claim 1, the hydrolysis of which results in xylose, arabinose and galactose in a molecular ratio of approximately 1:1:1 together with a trace of uronic acid.

(References on following page)

References Cited

UNITED STATES PATENTS 2,845,363  7/1958  Gatzeit _____ 261—209

OTHER REFERENCES

Cornwell et al., "Chem. Abst.," vol. 46, 1952, p. 7255 (A).

Suginra, "Cancer Chemotherapy Screening Data," No. 33–35, 1965, pp. 494–495.

LEWIS GOTTS, *Primary Examiner.*

J. R. BROWN, *Assistant Examiner.*

U.S. Cl. X.R.

167—78